United States Patent
Sun et al.

(10) Patent No.: US 10,322,945 B2
(45) Date of Patent: Jun. 18, 2019

(54) WATER PURIFYING APPARATUS FOR PURIFYING COOLING WATER OF POWER GENERATOR

(71) Applicant: PMAX TECHNOLOGY CORPORATION, McKinney, TX (US)

(72) Inventors: Yu Sun, New Taipei (TW); Jung-Shiung Liau, New Taipei (TW)

(73) Assignee: PMAX TECHNOLOGY CORPORATION, McKinney, TX (US)

(*) Notice: Subject to any disclaimer, the term of this patent is extended or adjusted under 35 U.S.C. 154(b) by 372 days.

(21) Appl. No.: 14/815,817

(22) Filed: Jul. 31, 2015

(65) Prior Publication Data

US 2017/0028313 A1 Feb. 2, 2017

(51) Int. Cl.
*C02F 1/00* (2006.01)
*C02F 1/04* (2006.01)
*C02F 103/02* (2006.01)

(52) U.S. Cl.
CPC ............... *C02F 1/008* (2013.01); *C02F 1/04* (2013.01); *C02F 2103/023* (2013.01);
(Continued)

(58) Field of Classification Search
CPC ...... C02F 1/008; C02F 1/04; C02F 2103/023; C02F 2209/005; C02F 2209/05; C02F 2209/40
See application file for complete search history.

(56) References Cited

U.S. PATENT DOCUMENTS 3,292,650 A * 12/1966 Bird .................... C02F 1/008
137/101.25
5,422,014 A * 6/1995 Allen .................. C02F 1/008
210/139

(Continued)

FOREIGN PATENT DOCUMENTS

CN 101302041 A * 11/2008 ............... C02F 1/00
CN 201648061 U * 11/2010 ............... C02F 1/00
(Continued)

OTHER PUBLICATIONS

JP2004108240A ENG.*
(Continued)

*Primary Examiner* — Youngsul Jeong
*Assistant Examiner* — Gabriel E Gitman
(74) *Attorney, Agent, or Firm* — Maschoff Brennan

(57) ABSTRACT

A water purifying apparatus for purifying cooling water of a power generator includes a cooling water tank, a steam condenser, an intermediate tank, a demineralizer, a boiler and a controlling member. The controlling member receives water and ammonia added-water so as to produce a mixed cooling water. The controlling member is configured to mix water which meets a predetermined quality criterion of electrical conductivity so as to supply the mixed cooling water to the cooling water tank. The cooling water tank is configured to flow the cooling water to the intermediate tank. The intermediate tank is configured to permit the outflow of the cooling water to the steam condenser if the buoyant force produced by the cooling water is strong enough to lift a pontoon. The water purifying apparatus can purify water with less cost, and protect the power generator from copper corrosion.

6 Claims, 3 Drawing Sheets

(52) U.S. Cl.
CPC .... *C02F 2209/005* (2013.01); *C02F 2209/05* (2013.01); *C02F 2209/40* (2013.01)

(56) References Cited

U.S. PATENT DOCUMENTS

| | | | | |
|---|---|---|---|---|
| 2010/0163399 | A1* | 7/2010 | Ishihara | C02F 1/008 203/7 |
| 2014/0021030 | A1* | 1/2014 | Schubert | C02F 1/048 203/10 |

FOREIGN PATENT DOCUMENTS

| | | | | |
|---|---|---|---|---|
| JP | 2004108240 | A * | 8/2004 | F01K 9/00 |
| KR | 20100055576 | A * | 5/2010 | F16K 27/02 |

OTHER PUBLICATIONS

CN101302041A ENG.*
KR20100055576A ENG.*
CN201648061U ENG.*
Buoyancy. (n.d.) Oxford English Dictionary.*
Overflow. (n.d.) Oxford English Dictionary.*
Rafiee et al. (2012). Improving the efficiency of thermal power plant using thermoelectric material. 2012 4th International Conference on Intelligent and Advanced Systems (ICIAS), (vol. 1, pp. 450-454). IEEE.*
CN201648061U_ENG (Espacenet machine translation of Hu) (Year: 2010).*
KR20100055576A_ENG (Espacenet machine translation of Wook) (Year: 2010).*
Rafiee et al., "Improving the Efficiency of Thermal Power Plant using Thermoelectric Material", 2012 4th International Conference on Intelligent and Advanced Systems (ICIAS), (vol. 1, pp. 450-454), IEEE (Year: 2012).*
CN101302041A_ENG (Espacenet machine translation of Sun) (Year: 2008).*
JP2004108240_ENG (J Pat Plat machine translation of Sao) (Year: 2004).*

* cited by examiner

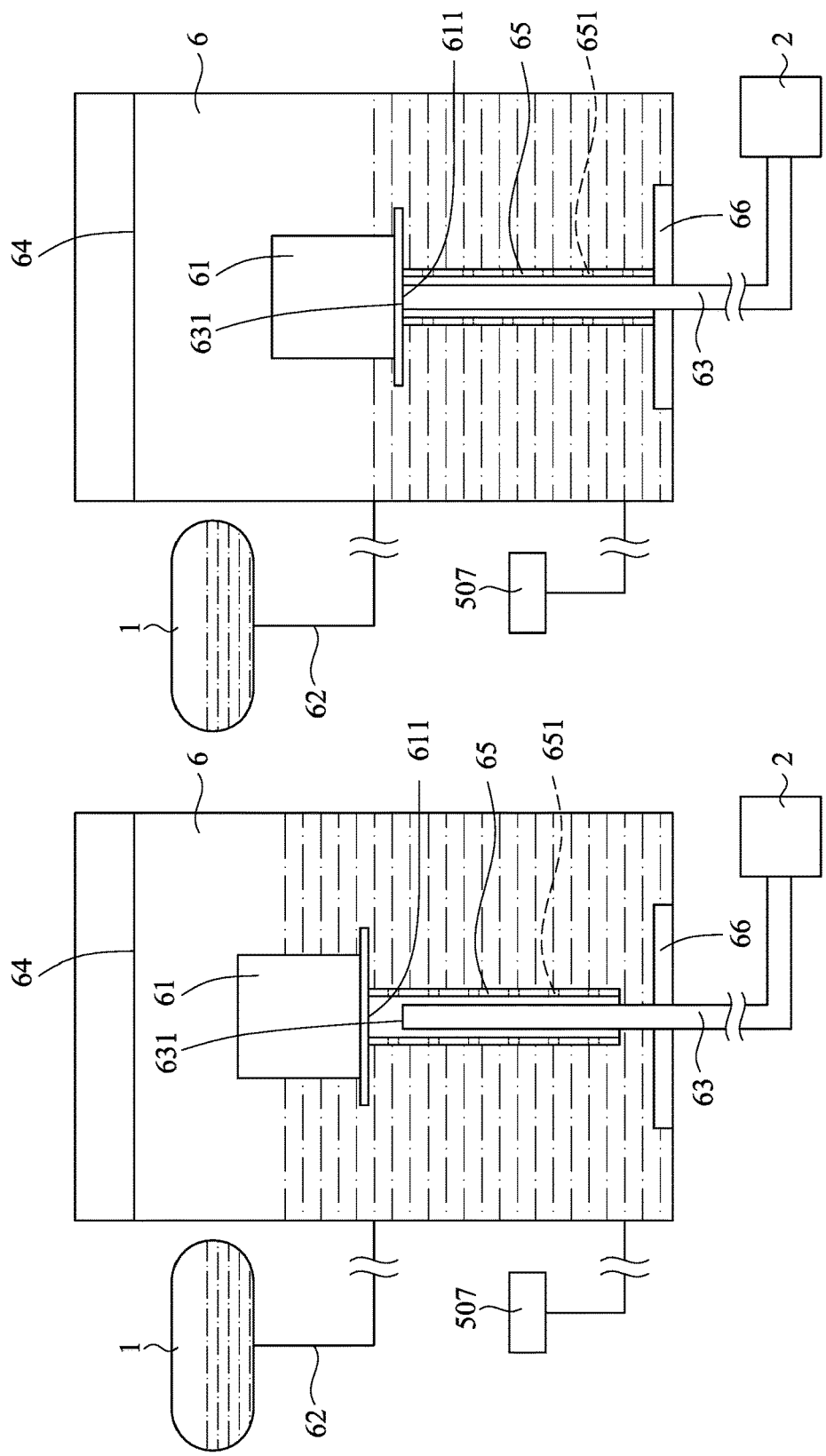

WATER PURIFYING APPARATUS FOR PURIFYING COOLING WATER OF POWER GENERATOR

FIELD OF THE INVENTION

The present invention relates to a water purifying apparatus, and more particularly to a water purifying apparatus for purifying cooling water of a power generator.

BACKGROUND OF THE INVENTION

When the cooling water flows through the stator bar of the generator, the temperature and electrical conductivity of the water rise, and the pH gets lower and leads to the corrosion. The corrosion product can migrate with the cooling water flow and deposit in stator bar, coil, or the screen of the filter during the cooling water circulation cycle. In extreme cases, the deposit can limit the cooling water current and lead to overheat and shutdown the generator, which causes power outage and severely damage the generator. Besides, it can result in the premature failure of the cooling water demineralizer. To replace the failed ion exchange resins will increase the operating costs and labor costs.

SUMMARY OF THE INVENTION

The present invention is for solving the disadvantages as above of the water purifying apparatus that purifies cooling water of a power generator.

Accordingly, an aspect of the present invention is to provide a water purifying apparatus that purifies cooling water of a power generator and prevents copper corrosion.

The water purifying apparatus that purifies cooling water of a power generator, comprises a cooling water tank of the power generator, a steam condenser, a intermediate tank, a demineralizer with an inlet pipe, a boiler and a controlling member. The intermediate tank is connected between the cooling water tank and the steam condenser for flowing an outflowing water of the cooling water tank to the steam condenser. The demineralizer is connected to the steam condenser through the inlet pipe, and is connected to the controlling member through an outlet pipe of the demineralizer, a first pipe and a second pipe of the controlling member, wherein the second pipe is connected to an ammonia supplying point. The boiler is connected to the demineralizer through the outlet pipe. The controlling member is connected between the cooling water tank and the demineralizer for receiving purified water from the first pipe and ammonia-added water from the second pipe so as to produce a mixed cooling water, wherein the controlling member further includes a supplying pipe through which the cooling water tank is connected. The controlling member is configured to mix water flowing from the first pipe and ammonia-added water from the second pipe to obtain the mixed cooling water which meets a predetermined quality criterion of electrical conductivity so as to supply the mixed cooling water to the cooling water tank through the supplying pipe. The cooling water tank is configured to flow a cooling water, which exceeds a predetermined water level, to the intermediate tank. The intermediate tank is configured to permit the outflow of an outflow cooling water to the steam condenser if the buoyant force produced by the cooling water is strong enough to lift a pontoon inside the intermediate tank. The water steam in the boiler flows to the steam condenser through a turbine, and is condensed into condensate water by the steam condenser.

According to another aspect of the present invention, the controlling member includes a conductivity detector, a programmable logic controller, a control panel, and an electric control valve.

According to another aspect of the present invention, the programmable logic controller controls the electric control valve to supply the mixed cooling water to the cooling water tank when the mixed cooling water meets a predetermined quality criterion.

According to another aspect of the present invention, the predetermined quality criterion of electrical conductivity is in a range between 0.27~2 µS/cm.

According to another aspect of the present invention, the controlling member stops supplying the mixed cooling water to cooling water tank by closing the electric control valve when the mixed cooling water doesn't meet the predetermined quality criterion of electrical conductivity.

According to another aspect of the present invention, the intermediate tank further includes a pontoon disposed within the intermediate tank, a third pipe connected to the inner cooling water tank, and a fourth pipe connected to the steam condenser.

According to another aspect of the present invention, the pontoon floats to permit the outflow of the outflow cooling water from the intermediate tank into the steam condenser through the fourth pipe when the buoyant force acting on the pontoon is larger than a sum of the weight of the pontoon and a suction force generated by the negative pressure from the steam condenser.

According to another aspect of the present invention, the pontoon falls to block the cooling water of the intermediate tank from flowing into the steam condenser when the buoyant force acting on the pontoon is smaller than a sum of the weight of the pontoon and a suction force generated by the negative pressure from the steam condenser According to another aspect of the present invention, the bottom side of the pontoon and the upper side of the fourth pipe are contacted and closed tightly to form a contact surface, with the contact surface being under the water level of the intermediate tank so as to maintain the negative pressure in the intermediate tank created by the outflowing water to the steam condenser when the outflow of water to the steam condenser is blocked.

By means of the technology of the present invention, the controlling member receives water from the first pipe and also receives ammonia-added water from the second pipe so as to produce a mixed cooling water as supplying water to flow to the cooling water tank. The electrical conductivity of the mixed cooling water can be controlled in a predetermined quality criterion range so as to ensure the copper concentration in the mixed cooling water is less than 2 ppb. The present invention prevents generator system from generating copper corrosion and copper deposition so as to achieve the effect of water purification without adding chemicals, waste water disposal, or adopting mixed beds. Compared with the prior art, the present invention can purify water with less cost, and at the same time can protect the power generator from corrosion, shutdown and damage.

BRIEF DESCRIPTION OF THE DRAWINGS

The structure and the technical means adopted by the present invention to achieve the above and other objects can be best understood by referring to the following detailed description of the preferred embodiments and the accompanying drawings.

FIG. 3 is a schematic diagram illustrating the intermediate tank according to one embodiment of the present invention, wherein the pontoon floats.

FIG. 4 is a schematic diagram illustrating the intermediate tank according to one embodiment of the present invention, wherein the pontoon falls to block water.

DETAILED DESCRIPTION OF THE PREFERRED EMBODIMENTS

Figure 1:
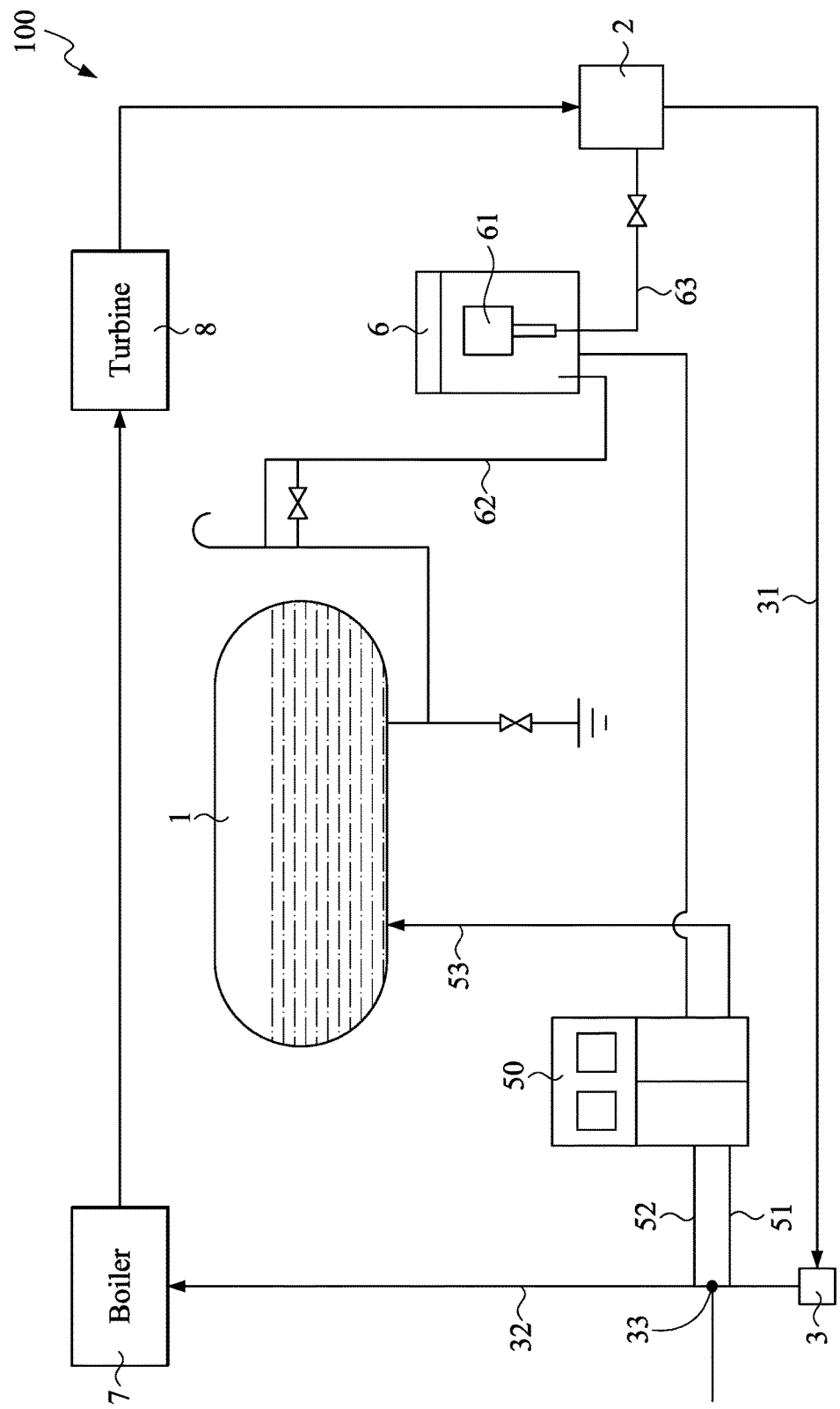
FIG. 1 is a schematic diagram illustrating the water purifying apparatus that purifies cooling water of a power generator according to one embodiment of the present invention.

Refer to FIG. 1. FIG. 1 is a schematic diagram illustrating the water purifying apparatus that purifies cooling water of a power generator according to one embodiment of the present invention. The water purifying apparatus 100 that purifies cooling water of a power generator includes a cooling water tank 1 of the power generator, a steam condenser 2, a demineralizer 3, a controlling member 50, an intermediate tank 6, and a boiler 7

The intermediate tank 6 is connected between the cooling water tank 1 and the steam condenser 2 for flowing an outflowing water of the cooling water tank 1 to the steam condenser 2

The demineralizer 3 is connected to the steam condenser 2 through an inlet pipe 31, and is connected to the controlling member 50 through an outlet pipe 32, a first pipe 51 and a second pipe 52 of the controlling member 50, wherein the second pipe 52 is connected to an ammonia supplying point 33.

The boiler 7 is connected to the demineralizer 3 through the outlet pipe 32. The water steam in the boiler 7 flows to the steam condenser 2 through a turbine 8, and is condensed into condensate water by the steam condenser 2.

The controlling member 50 is connected between the cooling water tank 1 and the demineralizer 3 for receiving water from the first pipe 51 and ammonia-added water from the second pipe 52 so as to produce a mixed cooling water, wherein the controlling member 50 further includes a supplying pipe 53 through which the cooling water tank 1 is connected.

The controlling member 50 is configured to mix water flowing from the first pipe 51 and ammonia-added water from the second pipe 52 to obtain the mixed cooling water which meets a predetermined quality criterion of electrical conductivity so as to supply the mixed cooling water to the cooling water tank 1 through the supplying pipe 53.

Figure 2:
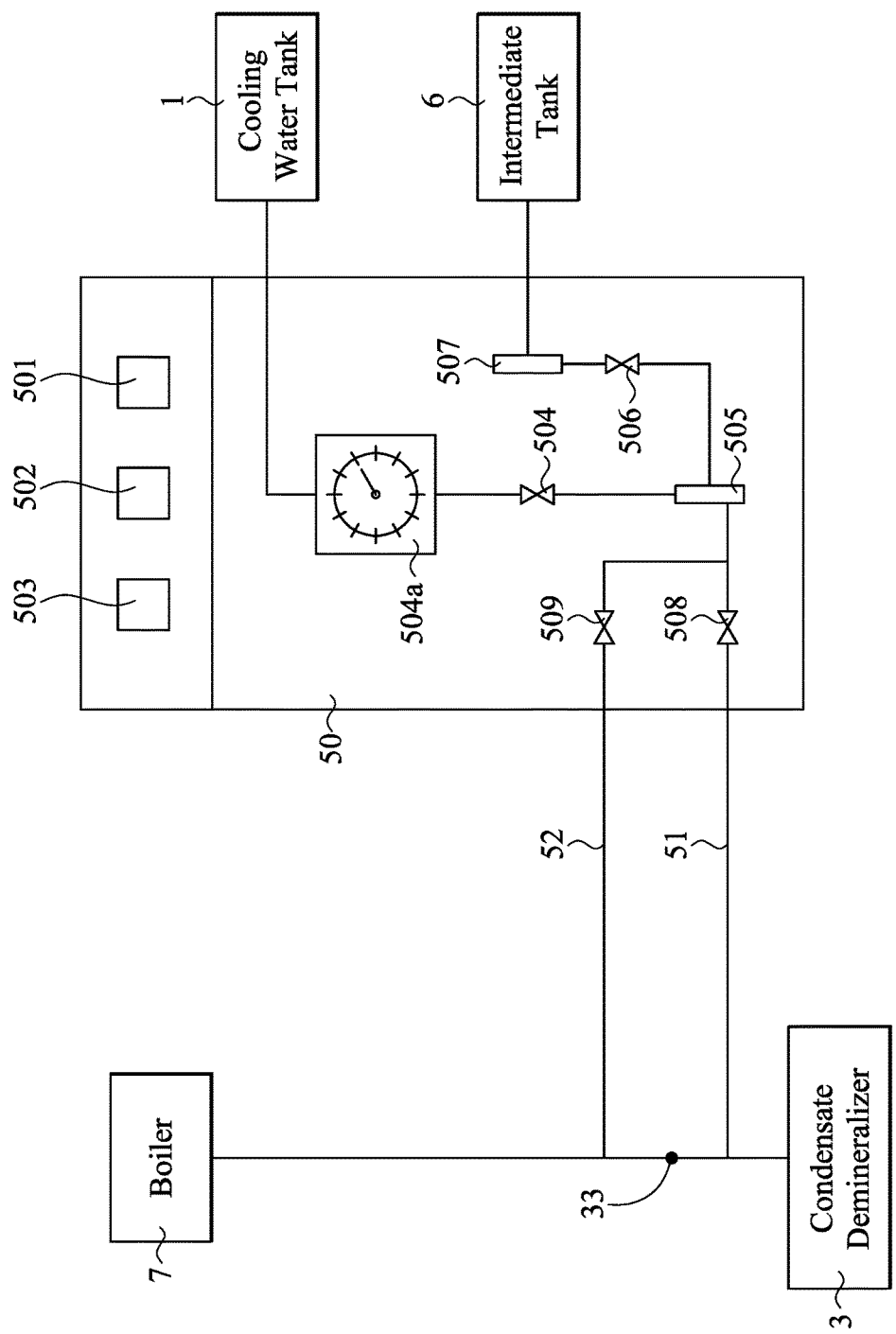
FIG. 2 is a partial schematic diagram illustrating the water purifying apparatus that purifies cooling water of a power generator according to one embodiment of the present invention.

FIG. 2 is a partial schematic diagram illustrating the water purifying apparatus that purifies cooling water of a power generator according to one embodiment of the present invention. In detail, the controlling member 50 includes a conductivity detector 501, a programmable logic controller 502, a control panel 503, an electric control valve 504, a mixing unit 505, a sampling valve 506, a conductivity cell 507, a first valve 508, and a second valve 509.

The first valve 508 adjusts water flowing to the mixing unit 505, and the second valve 509 adjusts ammonia-added water flowing to the mixing unit 505. The water and the ammonia-added water is mixed in the mixing unit 505. The sampling valve 506 adjusts mixed cooling water flowing to the conductivity cell 507.

The conductivity detector 501 detects electrical conductivity of the mixed cooling water in the conductivity cell 507, and transmits the electrical conductivity value to the programmable logic controller 502. The mixed cooling water in the conductivity cell 507 will flow to the intermediate tank 6 after the conductivity detector 501 performs the detection. The programmable logic controller 502 determines a predetermined quality criterion electrical conductivity, and calculates a pH value of the mixed cooling water by inputting the electrical conductivity value to a conversion formula of electrical conductivity and pH, and thereafter displays the pH value on the control panel 503. According to the predetermined quality criterion electrical conductivity, the programmable logic controller 502 determines an opening size of the second valve 509.

The programmable logic controller 502 also controls the electric control valve 504 according to the electrical conductivity of the mixed cooling water. The programmable logic controller 502 controls the electric control valve 504 to supply the mixed cooling water to the cooling water tank 1 when the mixed cooling water meets the predetermined quality criterion. A meter 504a measures the flowing rate of the mixed cooling water which passes through the electric control valve 504. The predetermined quality criterion of electrical conductivity is in a range between 0.27-2 g S/cm. The controlling member 50 stops supplying the mixed cooling water to cooling water tank 1 by closing the electric control valve 504 when the electrical conductivity of the mixed cooling water doesn't meet the predetermined quality criterion. For example, when the demineralizer 3 is malfunctioned, or when the steam condenser 2 leaks, by which the electrical conductivity of outflow water from demineralizer device 3 gets abnormally high, the controlling member 50 stops flowing water to cooling water tank 1 until the electrical conductivity returns to a value in a normal range.

Please refer to FIG. 1 again. The cooling water tank 1 is configured to permit the outflow of an outflow cooling water, which exceeds a predetermined water level, to the intermediate tank 6. The intermediate tank 6 is configured to permit the outflow of an outflow cooling water to the steam condenser 2 if the buoyant force produced by the cooling water is strong enough to lift a pontoon 61, which is disposed inside the intermediate tank 6. The intermediate tank 6 includes a third pipe 62 connected to the cooling water tank 1, and a fourth pipe 63 connected to the steam condenser 2

FIG. 3 is a schematic diagram illustrating the intermediate tank according to one embodiment of the present invention, wherein the pontoon floats. The intermediate tank 6 includes a pontoon 61, a limiting beam 64, a sleeve 65, a fourth pipe 63 and a strengthening board 66. The limiting beam 64 limits the height of the pontoon 61 driven by the buoyant force produced by the cooling water, preventing the pontoon 61 from departing. The pontoon 61 functions as a valve, can allow water flowing from the fourth pipe 63 to the steam condenser 2. The sleeve 65 restricts the moving path of the pontoon 61, and includes holes 651 disposed on the sleeve 65 for water to flow into the fourth pipe when pontoon is lifted. The strengthening board 66 strengthens the connection between the fourth pipe 63 and the bottom of the intermediate tank 6. Cooling water from the cooling water tank 1 to the intermediate tank 6 through the third pipe 62 provides a buoyant force in the intermediate tank 6. The pontoon 61 floats, so the bottom side 611 of the pontoon 61 and the upper side 631 of the fourth pipe 63 are separated to permit the outflow of the outflow cooling water from the intermediate tank 6 into the steam condenser 2 through the fourth pipe 63 when the buoyant force acting on the pontoon 61 is larger than a sum of the weight of the pontoon 61 and a suction force generated by the negative pressure from the steam condenser 2.

Refer to FIG. 4. FIG. 4 is a schematic diagram illustrating the intermediate tank according to one embodiment of the present invention, wherein the pontoon falls to block water. The buoyant force acting on the pontoon 61 decreases according to water in the intermediate tank 6 flowing to the steam condenser 2. The pontoon 61 falls to block the cooling water of the intermediate tank 6 from flowing into the steam condenser 2 when the buoyant force acting on the pontoon 61 is smaller than a sum of the weight of the pontoon 61 and a suction force generated by the negative pressure from the steam condenser 2. The bottom side 611 of the pontoon 61 and the upper side 631 of the fourth pipe 63 are contacted and closed tightly to form a contact surface, with the contact surface below the intermediate tank 6 so as to maintain the negative pressure in the intermediate tank 6 created by the outflowing water to the steam condenser 2 vacuum when the outflow of water to the steam condenser 2 is blocked.

By providing a water purifying apparatus for purifying cooling water of a power generator, the invention can purify water with less cost, and protect the power generator from copper corrosion in comparison to traditional water purifying apparatus.

The above description should be considered as only the discussion of the preferred embodiments of the present invention. However, a person skilled in the art may make various modifications to the present invention. However, those modifications still fall within the spirit and scope defined by the appended claims.

What is claimed is:

1. A water purifying apparatus that purifies cooling water of a power generator, comprising:
    a cooling water tank of the power generator;
    a steam condenser;
    a demineralizer connected to the steam condenser through an inlet pipe;
    a boiler connected to the demineralizer through an outlet pipe for boiling water from the demineralizer to become a water steam in such a manner that the outlet pipe is connected between the boiler and the demineralizer, wherein the water flowing in the outlet pipe is partially branched to a controlling member in such a manner that the controlling member is connected with the outlet pipe through a first pipe and a second pipe in which the first pipe is in an upper stream position of the outlet pipe and the second pipe is in a lower stream position of the outlet pipe, and an ammonia supplying point is disposed at the outlet pipe between the upper stream position and the lower stream position such that an ammonia-added water flowing out from the ammonia supplying point is directly supplied to the boiler and to the second pipe but not supplied to the first pipe, and the water supplied to the first pipe is not processed through the ammonia supplying point;
    an intermediate tank connected between the cooling water tank and the steam condenser for flowing an outflowing water of the cooling water tank to the steam condenser, wherein the intermediate tank includes a pontoon disposed within the intermediate tank, a third pipe connected to the cooling water tank, and a fourth pipe connected to the steam condenser; and
    a turbine connected between the boiler and the steam condenser,
    wherein the controlling member is connected between the cooling water tank and the demineralizer for receiving water from the first pipe and the ammonia-added water from the second pipe so as to produce a mixed cooling water, wherein the controlling member includes a conductivity detector, a programmable logic controller, an electric control valve, a mixing unit, a first valve disposed on the first pipe, a second valve disposed on the second pipe, and a supplying pipe through which the cooling water tank is connected,
    wherein the first valve adjusts water flowing to the mixing unit, the second valve adjusts ammonia-added water flowing to the mixing unit such that the water and the ammonia-added water are mixed in the mixing unit, and a portion of the mixed cooling water in the mixing unit flows to a conductivity cell,
    the conductivity detector is configured to detect an electrical conductivity value of the mixed cooling water in the conductivity cell, and the detected electrical conductivity value is transmitted to the programmable logic controller, and the mixed cooling water in the conductivity cell then directly flows to the intermediate tank without flowing through the cooling water tank after the conductivity detector performs the detection,
    the programmable logic controller is configured to determine a predetermined quality criterion for electrical conductivity, calculates a pH value of the mixed cooling water by inputting the electrical conductivity value to a conversion formula of electrical conductivity and pH value, determines an opening size of the second valve, controls the electric control valve according to the electrical conductivity of the mixed cooling water, and controls the electric control valve to supply a remaining portion of the mixed cooling water to the cooling water tank when the programmable logic controller determines that the pH value of the mixed cooling water meets the predetermined quality criterion for electrical conductivity,
    the cooling water tank is configured to flow a cooling water, which exceeds a predetermined water level, to the intermediate tank,
    the intermediate tank is configured to permit the outflow of an outflow cooling water to the steam condenser if the buoyant force produced by the cooling water is strong enough to lift a pontoon inside the intermediate tank, wherein the pontoon floats to permit the outflow of the outflow cooling water from the intermediate tank into the steam condenser through the fourth pipe when the buoyant force acting on the pontoon is larger than a sum of the weight of the pontoon and a suction force generated by the negative pressure from the steam condenser,
    the water steam in the boiler flows to the steam condenser through the turbine, and is condensed into a condensate water by the steam condenser, and the condensate water flows to the demineralizer through the inlet pipe and then flows to the boiler through the outlet pipe to form a water cycle, and
    the condensate water flowing to the boiler or to the controlling member is from the steam condenser through the demineralizer.

2. The water purifying apparatus of claim 1, wherein the controlling member includes a control panel, and the programmable logic controller displays the pH value on the control panel.

3. The water purifying apparatus of claim 1, wherein the predetermined quality criterion of electrical conductivity is in a range of 0.27-2 μS/cm.

4. The water purifying apparatus of claim 1, wherein the programmable logic controller stops supplying the mixed cooling water to the cooling water tank by closing the electric control valve when the mixed cooling water doesn't meet the predetermined quality criterion of electrical conductivity.

5. The water purifying apparatus of claim 1, wherein the pontoon is configured to fall to block the cooling water of the intermediate tank from flowing into the steam condenser when the buoyant force acting on the pontoon is smaller than a sum of the weight of the pontoon and a suction force generated by the negative pressure from the steam condenser.

6. The water purifying apparatus of claim 1, wherein the bottom side of the pontoon and the upper side of the fourth pipe are contacted and closed tightly to form a contact surface, with the contact surface being under the water level of the intermediate tank so as to maintain the negative pressure in the intermediate tank created by the outflowing water to the steam condenser when the outflow of water to the steam condenser is blocked.

* * * * *